United States Patent [19]

Hamper

[11] Patent Number: 5,792,430
[45] Date of Patent: Aug. 11, 1998

[54] SOLID PHASE ORGANIC SYNTHESIS DEVICE WITH PRESSURE-REGULATED MANIFOLD

[75] Inventor: Bruce C. Hamper, Kirkwood, Mo.

[73] Assignee: Monsanto Company, St. Louis, Mo.

[21] Appl. No.: 900,120

[22] Filed: Jul. 25, 1997

Related U.S. Application Data

[63] Continuation-in-part of Ser. No. 695,720, Aug. 12, 1996, abandoned.

[51] Int. Cl.$^6$ .............................. C08F 251/00; B01J 19/00
[52] U.S. Cl. .................... 422/131; 422/102; 422/103; 422/116; 422/134; 422/138; 536/23.1
[58] Field of Search ........................ 422/131, 134, 422/138, 100, 102, 103, 116; 536/23.1

[56] References Cited

U.S. PATENT DOCUMENTS

| | | | |
|---|---|---|---|
| 2,153,105 | 4/1939 | Szecsi | 23/259 |
| 4,055,202 | 10/1977 | Greene | 141/59 |
| 4,231,989 | 11/1980 | Thoma | 422/63 |
| 4,305,437 | 12/1981 | Greene | 141/59 |
| 4,313,476 | 2/1982 | Bennett et al. | 141/59 |
| 4,649,967 | 3/1987 | Gruenstein et al. | 141/59 |
| 4,810,471 | 3/1989 | Wachob et al. | 422/103 |
| 5,139,056 | 8/1992 | Sagawa et al. | 141/1 |
| 5,217,619 | 6/1993 | Redmond, Jr. et al. | 210/650 |
| 5,240,680 | 8/1993 | Zuckermann et al. | 422/67 |
| 5,252,296 | 10/1993 | Zuckermann et al. | 422/116 |
| 5,288,514 | 2/1994 | Ellman | 427/2 |
| 5,472,672 | 12/1995 | Brennan | 422/131 |
| 5,541,314 | 7/1996 | McGraw et al. | 536/25.31 |

FOREIGN PATENT DOCUMENTS

| | | |
|---|---|---|
| 0 558 050 A1 | 9/1993 | European Pat. Off. |
| 4403967A1 | 2/1994 | Germany. |
| WO 91/07504 | 5/1991 | WIPO. |
| WO 91/13084 | 9/1991 | WIPO. |
| WO 91/17823 | 11/1991 | WIPO. |
| WO93/12427 | 6/1993 | WIPO. |
| WO9603212A1 | 2/1996 | WIPO. |

OTHER PUBLICATIONS

Zuckerman et al.; Peptide Research: Automated Peptide–Resin Deprotection/Cleavage by a Robotic Workstation; vol. 5, No. 3; 1992 pp. 169–174.

Zuckerman, et al.; Design, construction and application of a fully automated equimolar peptide mixtue synthesizer; Int. J. Peptide Protein Res. 40; 1992; pp. 497–506.

*Primary Examiner*—Nina Bhat
*Attorney, Agent, or Firm*—Grace L. Bonner; Arnold, White & Durkee

[57] ABSTRACT

A solid phase organic synthesis device comprising a manifold and an optional heating block mounted to an upper surface of the manifold. The manifold includes an internal cavity and a first array of holes coupled to the internal cavity. The heating block includes a second array of holes vertically aligned with the corresponding holes of the first array. The first and second arrays of holes are adapted to accommodate flow-through reaction vessels. Each reaction vessel is secured in one of the holes of the first array and a vertically-aligned one of the holes of the second array. The interiors of the reaction vessels are in communication with the internal cavity of the manifold. The flow-through reaction vessels, which contain solid phase resins for solid phase organic synthesis, are controlled by regulating the pressure within the manifold. The manifold includes a pressure port coupled to both an inert gas source and a pressure control device, and a vacuum port coupled to a vacuum control device and a vacuum source. The pressure control device and the vacuum control device are easily operated to create a vacuum and varying degrees of positive pressure within the manifold, as required when carrying out an organic synthesis. A second manifold is mounted on the first manifold in the absence of the reaction vessels for supplying inert gas used to concentrate organic synthesis products.

29 Claims, 13 Drawing Sheets

SOLID PHASE ORGANIC SYNTHESIS DEVICE WITH PRESSURE-REGULATED MANIFOLD

RELATED APPLICATIONS

This is a continuation-in-part of U.S. application Ser. No. 08/695,720, filed on Aug. 12, 1996 now abandoned.

FIELD OF THE INVENTION

The present invention relates generally to devices for preparing combinatorial libraries by solid phase organic synthesis and, more particularly, relates to such a device having a pressure-regulated manifold for simultaneously controlling multiple reaction vessels and simultaneously treating solid phase resins contained in the reaction vessels. The term "solid phase resins" as used herein shall include polymeric resins and polymeric reagent resins.

BACKGROUND OF THE INVENTION

Combinatorial chemistry makes a large number of chemical variants all at one time, tests the chemical variants for bioactivity, binding with a target or other desired properties, and then isolates and identifies the most promising compounds for further development. In combinatorial chemistry experiments, chemical libraries (large collections of compounds of varied structure) are produced by sequentially linking different molecular building blocks, or by adding substituent reagents to a core structure such as a polycyclic compound. Libraries may consist of molecules free in solution, linked to solid particles or beads, or arrayed on surfaces of modified microorganisms.

Combinatorial libraries are created in the laboratory by one of two methods—split synthesis or parallel synthesis. In split synthesis, compounds are assembled on the surfaces of microparticles or beads. In each step, beads from previous steps are partitioned into several groups and a new building block is added. The different groups of beads are then recombined and separated once again to form new groups. The next building block is added, and the process continues until the desired combinatorial library has been assembled.

In parallel synthesis, different compounds are synthesized in separate vessels (without remixing), often in an automated fashion. Unlike split synthesis, which requires a solid support, parallel synthesis can be done either on a solid support or in solution. Solid phase synthesis is advantageous because it permits the use of excesses of reagents to drive reactions to completion, and these excess reagents can be washed away from beads very easily afterward. A commonly used format for parallel synthesis is a multi-well microtiter plate. Robotics instrumentation can be used to add different reagents to separate wells of a microtiter plate in a predefined manner to produce combinatorial libraries. Hits from the library can then be identified by well location.

Planning and performing combinatorial experiments in the laboratory is a complex and potentially tedious process. In recent years, devices have been developed for automating combinatorial parallel synthesis and split synthesis. One such device includes reaction blocks containing multiple reaction vessels coupled to corresponding valves. To carry out parallel reactions in these vessels ,or wash beads contained in the vessels, all the valves must be simultaneously operated to regulate the pressure within each vessel. Significant drawbacks of such multi-valve devices are that they are overly complex and tedious to operate.

A need, therefore, exists for a solid phase organic synthesis device that overcomes the aforementioned shortcomings associated with existing multi-valve devices.

SUMMARY OF THE INVENTION

A solid phase organic synthesis device of the invention comprises a manifold and a heating block mounted to an upper surface of the manifold. The manifold includes an internal cavity and a first array of holes coupled to the internal cavity. The heating block includes a second array of holes vertically aligned with the corresponding holes of the first array. The first and second arrays of holes are adapted to accommodate flow-through reaction vessels. Each reaction vessel is secured in one of the holes of the first array and a vertically-aligned holes of the second array. The output ends (tips) of the reaction vessels provide communication of the inside of each vessel with the internal cavity of the manifold. Preferably, the outlet ends have an internal diameter of about 0.005 to 0.1 in. (0.127 to 2.54 mm). The flow-through reaction vessels, which contain solid phase resins for solid phase organic synthesis, are controlled by regulating the pressure within the manifold to retain liquid within the vessel or to allow it to flow into the manifold. The manifold includes a pressure port coupled to both a regulated inert gas source and a means for controlling pressure within the manifold, and a vacuum port coupled to a means for controlling vacuum within the manifold. The pressure control means may be manually operated but, preferably, an electronic pressure control device will be disposed to control the pressure in the manifold to pressures in the range of atmospheric to 1.0 psig. (0 to 6.9 kPa). The vacuum control means may either be operated manually or be self regulating, and will provide a vacuum of about −10 to −30 in Hg (0 to 508 torr) within the manifold when required.

The solid phase organic synthesis device of the invention is intended to carry out four operations in sequence: (a) reacting materials which are bound to solid phase resins within a liquid medium; (b) removal of the liquid medium and washing of the solid resins; (c) introduction of a cleavage solution to elute the reaction products from the resins and collecting the products; (d) concentration of the products in the collection vials. In the first three operations, the reaction vessels contain liquids in contact with the resins. The liquids are retained in the reaction vessels or drained from them depending on the pressure or vacuum in the manifold. In the fourth operation, the products are contained in the collection vials and are concentrated by evaporation under a stream of inert gas such as nitrogen or argon.

The device operates in three gas pressure modes for manipulation of the solid phase resins in the reaction vessels. First, to remove excess reagents or wash solvents from the solid phase resins, the vacuum control means provides a vacuum within the manifold. Second, to keep reagents or wash solvents in contact with the solid phase resins, the pressure control means applies a slight positive pressure within the manifold, typically about 0.1 psig. (0.69 kPa), thereby preventing liquid from draining from the reaction vessels. Third, to mix or agitate the solid phase resins by bubbling gas through the liquid, the pressure control means applies a stronger positive pressure within the manifold, typically about 0.2 to 1.0 psig. (1.38 to 6.9 kPa).

In addition to manipulating the solid-phase resins in the reaction vessels by application of different gas pressures within the cavity of the manifold, the device facilitates cleavage of products bound to the solid phase resins. Collection vials are mounted to a rack disposed within the manifold and are vertically aligned with the corresponding flow-through reaction vessels. After treating the solid phase resins with a cleavage solution added to the reaction vessels, the products are drained from the reaction vessels into the corresponding vials. Thereafter, liquids in the vials are evaporated by placing a second manifold over the collection vials and applying a stream of inert gas to each vial to concentrate the collected products. The inert gas containing volatile solvents leaves through one of the ports of the lower manifold, and the solvents are condensed and trapped in a suitable container cooled from −78° to −196° C.

BRIEF DESCRIPTION OF THE DRAWINGS

Other objects and advantages of the invention will become apparent upon reading the following detailed description and upon reference to the drawings in which.

Figure 1:
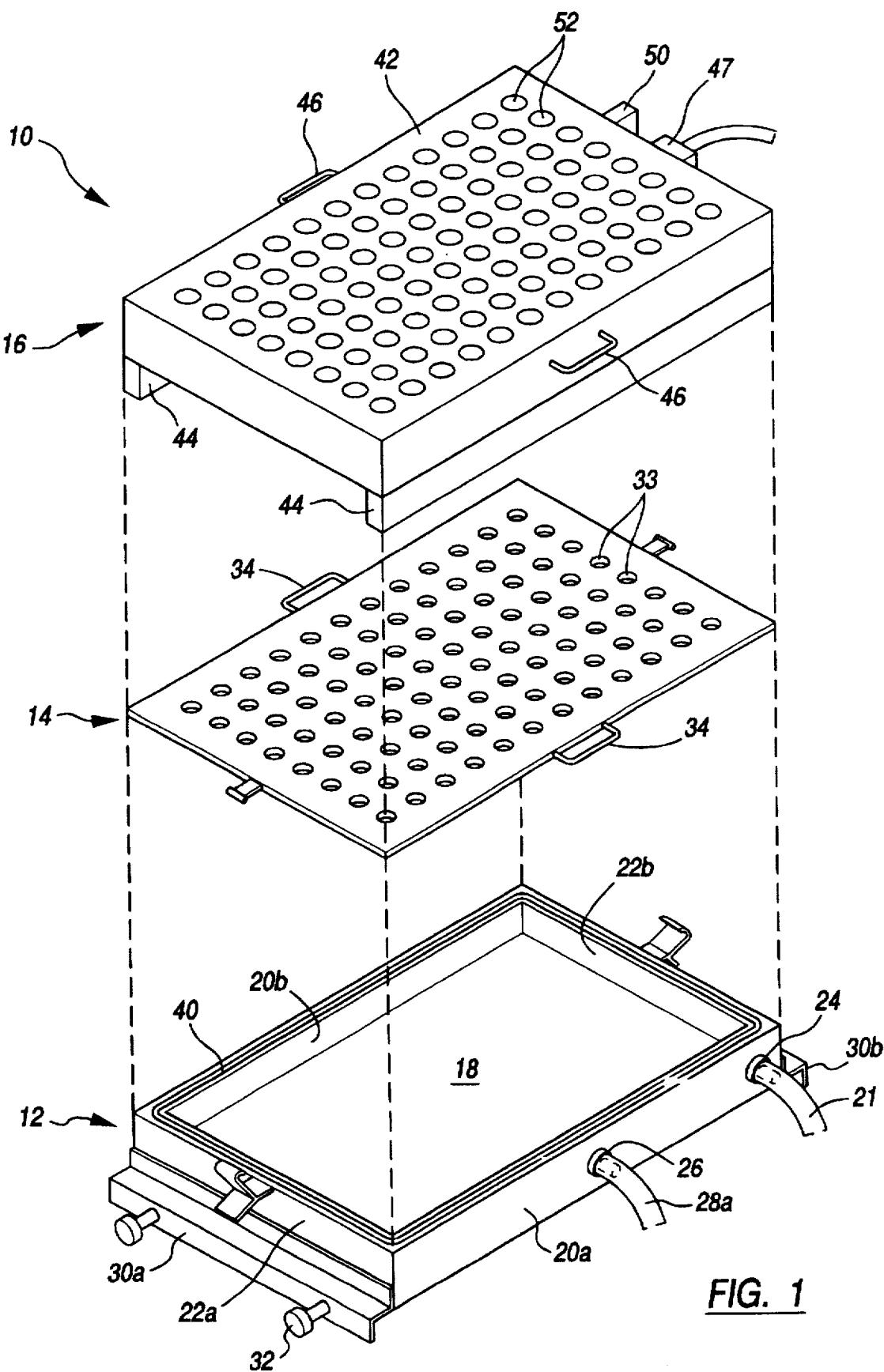
FIG. 1 is an exploded isometric view of a solid phase organic synthesis device embodying the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Figure 2:
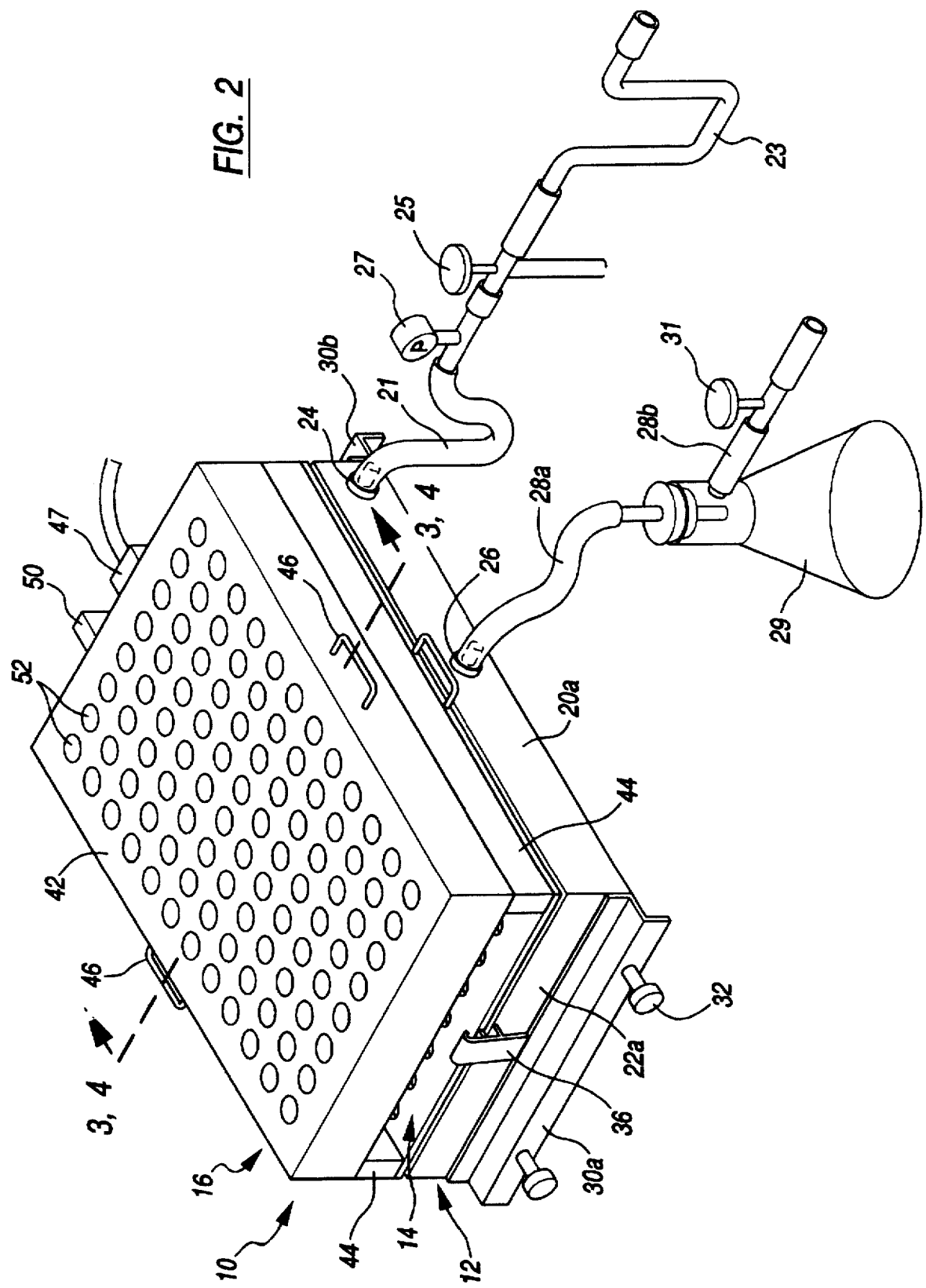
FIG. 2 is an isometric view of the solid phase organic synthesis device after it has been assembled and connected to external pressure-regulating components.

Turning now to the drawings, FIGS. 1 and 2 are isometric views depicting a solid phase organic synthesis device 10 embodying the present invention. As best shown in FIG. 1, the device comprises three primary parts: an open polypropylene box 12, a stainless steel plate 14, and a heating block 16. The box 12 includes a bottom 18, a pair of opposing side walls 20a–b, and a pair of opposing end walls 22a–b. To allow an inert gas to be pumped into the box 12 once it is covered with the plate 14, the side wall 20a includes a pressure port 24 connected by a flexible hose 21 to a pressure control device, and a vacuum port 26 connected by flexible hose 28b to a vacuum control device.

FIG. 2 shows the device assembled and connected to means for controlling pressure and vacuum within the box, in this embodiment manual control of both pressure and vacuum. Pressure is controlled using oil bubbler 23 and a conventional regulated inert gas source (not shown) via a three-way valve 25. The inert gas source may supply nitrogen, argon, air, or other inert gas. A pressure sensor 27 is coupled to the hose 21 to measure the pressure therein. To allow a vacuum to be applied within the box 12 once it is covered with the plate 14, the side wall 20a includes a vacuum port 26 connected by a flexible hose 28a to a conventional waste trap 29 (also known as a "vacuum trap"). The waste trap 29 is, in turn, connected by a flexible hose 28b to a conventional vacuum pump or house vacuum line (not shown) via an on/off valve 31. Connected to the respective end walls 22a–b are a pair of brackets 30a–b that allow the box 12 to be attached to a shaker table (not shown) using fasteners 32.

The manually controlled pressure and vacuum controls shown in FIGS. 2—10 are used to illustrate the operations carried out with the organic synthesis device of the invention. However, they are only one mode of controlling pressure and vacuum in the manifold, as will be appreciated by those familiar with the art. The oil bubbler 23 serves as an indicator of the pressure in the manifold and a means by which the three-way valve 25 may be adjusted to control the pressure. An alternative means would replace the three-way valve 25 and the oil bubbler 23 with an electronic pressure control valve capable of providing the very low pressures needed during the sequence of operations discussed below. These pressures would range from about 0.05 to 0.2 psig. (0.34 to 1.38 kPa) during the filling of the reaction vessels with liquid, and for holding the liquid in the vessels. A pressure of about 0.2 to 1.0 psig.(1.38 to 6.9 kPa) is needed to cause gas to bubble up through the liquid in the vessels. Other methods of controlling the pressure in the manifold within the scope of the invention will be evident to the skilled worker in the art. Similarly, instead of a manually controlled valve 31, one could provide an electronically controlled valve to maintain the desired vacuum in the manifold.

Referring to FIGS. 1 and 2, the stainless steel plate 14 includes an array of ninety-six holes 33 arranged in an eight-by-twelve matrix. (The invention is not limited to such a matrix and may use different arrays with a larger or smaller number of holes.) The plate 14 further includes a pair of opposing handles 34 for handling the plate 14. In the assembled device 10 in FIG. 2, the plate 14 is placed on top of the box 12 and secured thereto using fasteners such as clamps 36. To provide a leakproof seal between the plate 14 and the box 12, a gasket 40 sits partially in a groove extending about upper surfaces of the side walls 20a–b and end walls 22a–b of the box 12. The lower peripheral surface of the box 12 rests on the gasket 40.

The combination of the upper stainless steel plate 14 and the lower box 12 defines a manifold generally in the form of a rectangular parallelepiped. The manifold includes an internal cavity defined by the bottom 18, the pair of opposing side walls 20a–b, the pair of opposing end walls 22a–b, and the plate 14.

The heating block 16 includes a main body 42 and a pair of opposing feet 44 extending downward from opposing sides of the main body 42. The main body 42 is preferably composed of a thermally conductive metal such as aluminum, and the feet 44 are preferably composed of a thermally nonconductive plastic such as polypropylene. The heating block 16 further includes a pair of opposing handles 46 for handling the block 16. When the heating block 16 is placed on top of the stainless steel plate 14, the opposing feet 44 rest on opposing marginal portions of the plate 14 and create a gap between the main body 42 and the plate 14.

To allow the main body 42 to be heated, an electrical box 47 is mounted to one side of the main body 42 and electrically connected to a heating pad 48 mounted beneath the main body 42. The electrical box 47 accommodates a power cord, line fuse, and ground and power connections. In a preferred embodiment, the heating pad 48 is a 500 watt/ 120 volt element commercially available from Minco of Minneapolis, Minn. When the heating pad 48 is activated, the pad 48 heats up the main body 42. To measure the temperature of the heated main body 42, a thermocouple 50 is mounted to the side of the main body 42. The gap created between the heated main body 42 and the plate 14 by the feet 44 minimizes heat transfer between the heated main body 42 and the plate 14.

The main body 42 includes an array of ninety-six holes 52 arranged in an eight-by-twelve matrix. When the device 10 is assembled as shown in FIG. 2, the holes 52 of the main body 42 are vertically aligned with corresponding holes 33 of the plate 14.

Figure 3:
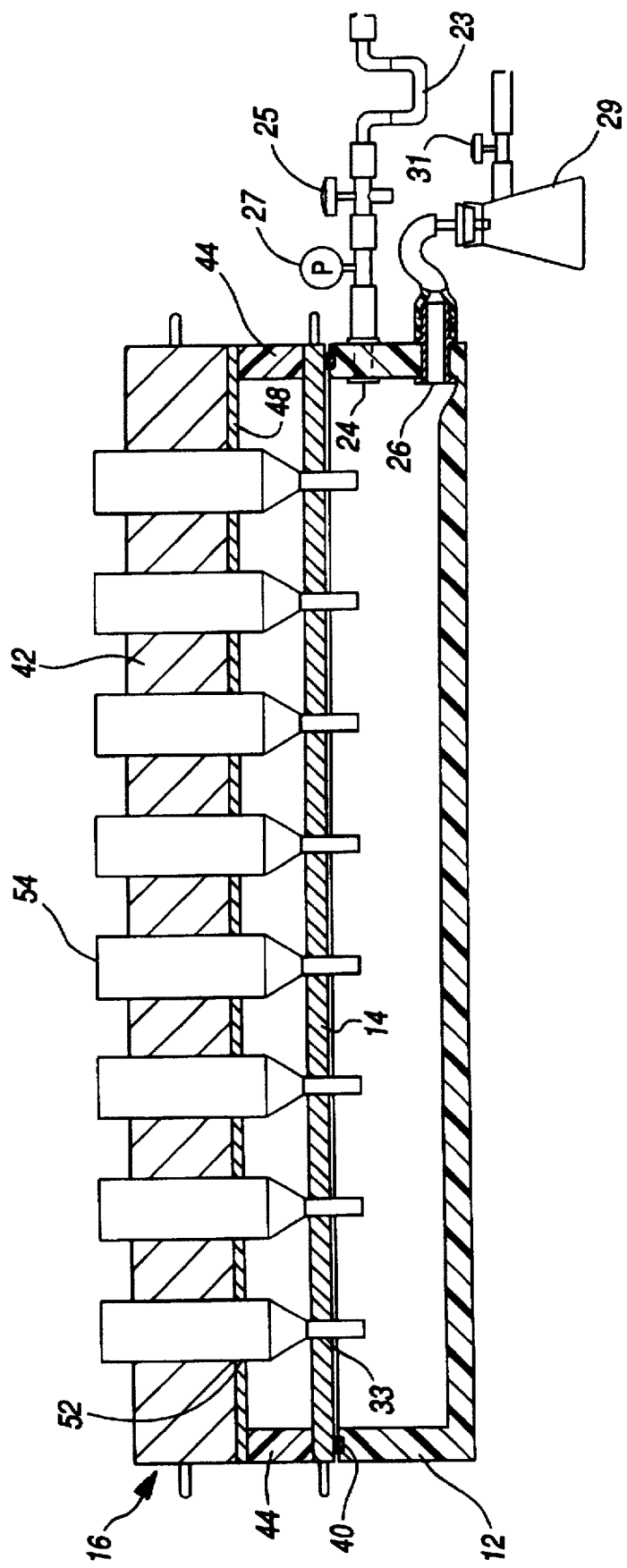
FIG. 3 is a sectional view taken generally along line 3—3 in FIG. 2.
Figure 4:
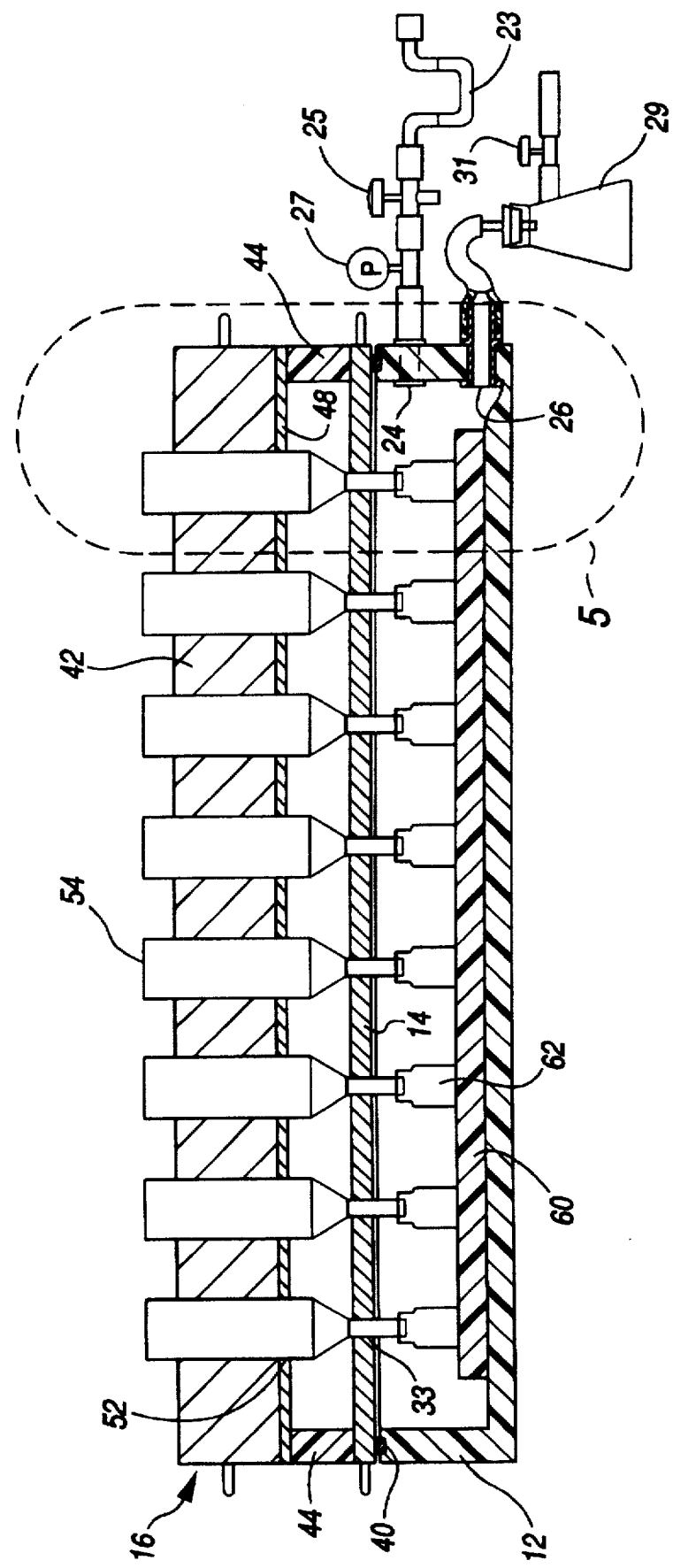
FIG. 4 is a sectional view taken generally along line 4—4 in FIG. 2.
Figure 5:
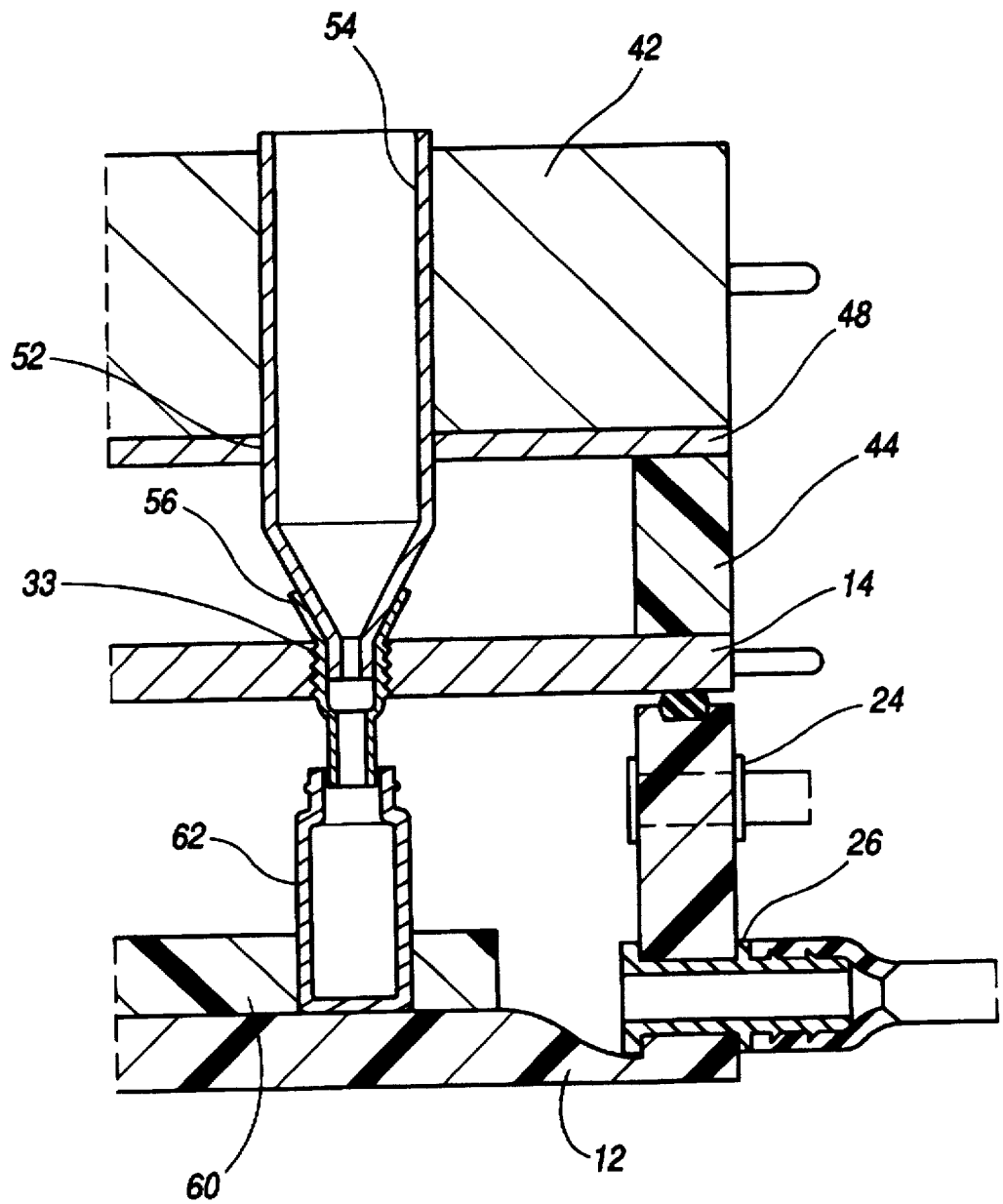
FIG. 5 is a magnified sectional view of dotted area 5 in FIG. 4.

Referring to FIGS. 3–5, each aligned pair of holes 33 and 52 is adapted to accommodate a flow-through reaction vessel 54. The diameter of each hole 52 is only slightly greater than the outer diameter of each vessel 54 so that the vessel 54 fits snugly within the hole 52. The diameter of each hole 33 is substantially smaller than the diameter of each hole 52 so that the reduced-diameter distal tip of the vessel 54 can be retained within the associated hole 33. More specifically, as best shown in FIG. 5, the peripheral inner surface defining each hole 33 is threaded, and a hollow fitting 56 is threadably inserted into each hole 33. The distal tip of the vessel 54 is then inserted into the hollow fitting 56. To snugly engage the distal tip of the vessel 54 with the hollow fitting 56, both the distal tip of the vessel 54 and an upper receiving portion of the hollow fitting 56 are tapered.

A flow-through reaction vessel has openings at the top and bottom. Thus, liquid introduced through the top can flow out the bottom unless prevented from doing so. In the prior art, valves have been used, but in this invention, pressure in the manifold controls the withdrawal of liquids. In order to achieve stable pressures within the manifold defined by box 12 and plate 14, the fittings 56 must provide adequate restriction of the gas flow. Preferably, a luer adapter or other suitable fitting having a narrow-bore inside diameter is used to provide a restricted gas flow and stable manifold pressures. In one embodiment, plate 14 is provided with fittings 56 having an internal diameter of 0.040 in. (1 mm) (Upchurch Scientific, Inc., Oak Harbor, Wash., P624) to achieve stable internal manifold pressures and good liquid flow characteristics. The internal diameter selected is related to the maximum flow rate of inert gas which is provided to the manifold and may range from about 0.005 to 0.1 in. (0.125 to 2.5 mm).

When the gas pressure in the manifold is high enough, it will prevent liquid from draining into the manifold from the reaction vessels. The actual pressure required will depend on the amount of liquid to be added. As the reaction vessels are being filled, the gas will pass upward through those which have not been filled. The amount of gas needed to maintain the pressure at a level which prevents the reaction vessels from draining will be the highest at the beginning of the filling process and gradually be reduced as the reaction vessels are filled. The pressure control device maintains a constant pressure inside the manifold during this process.

Figure 12:
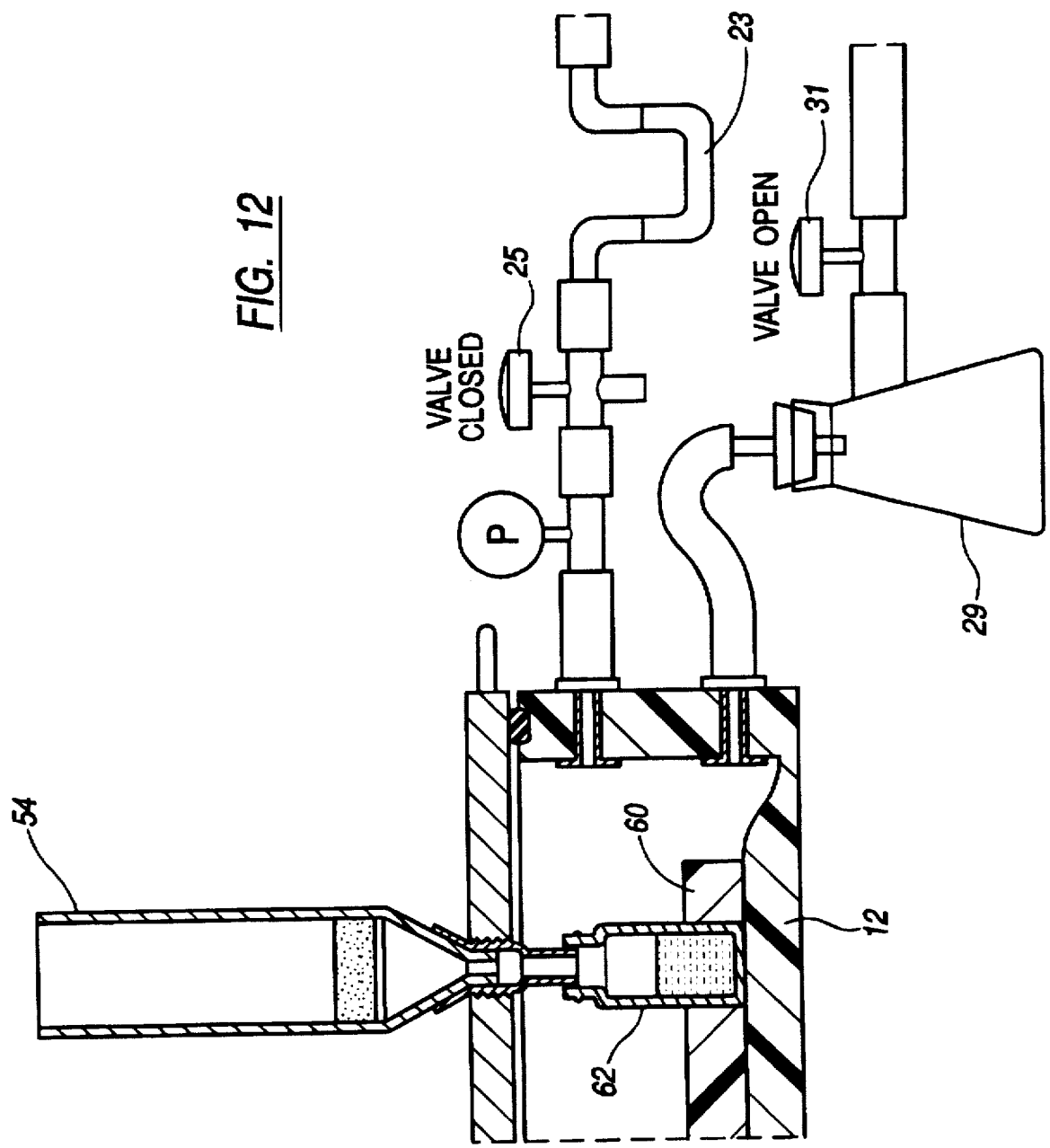
FIG. 12 is a sectional view similar to FIG. 4 showing the application of a vacuum within the manifold to collect products of a cleavage reaction in collection vials located beneath the flow-through reaction vessels.
Figure 13:
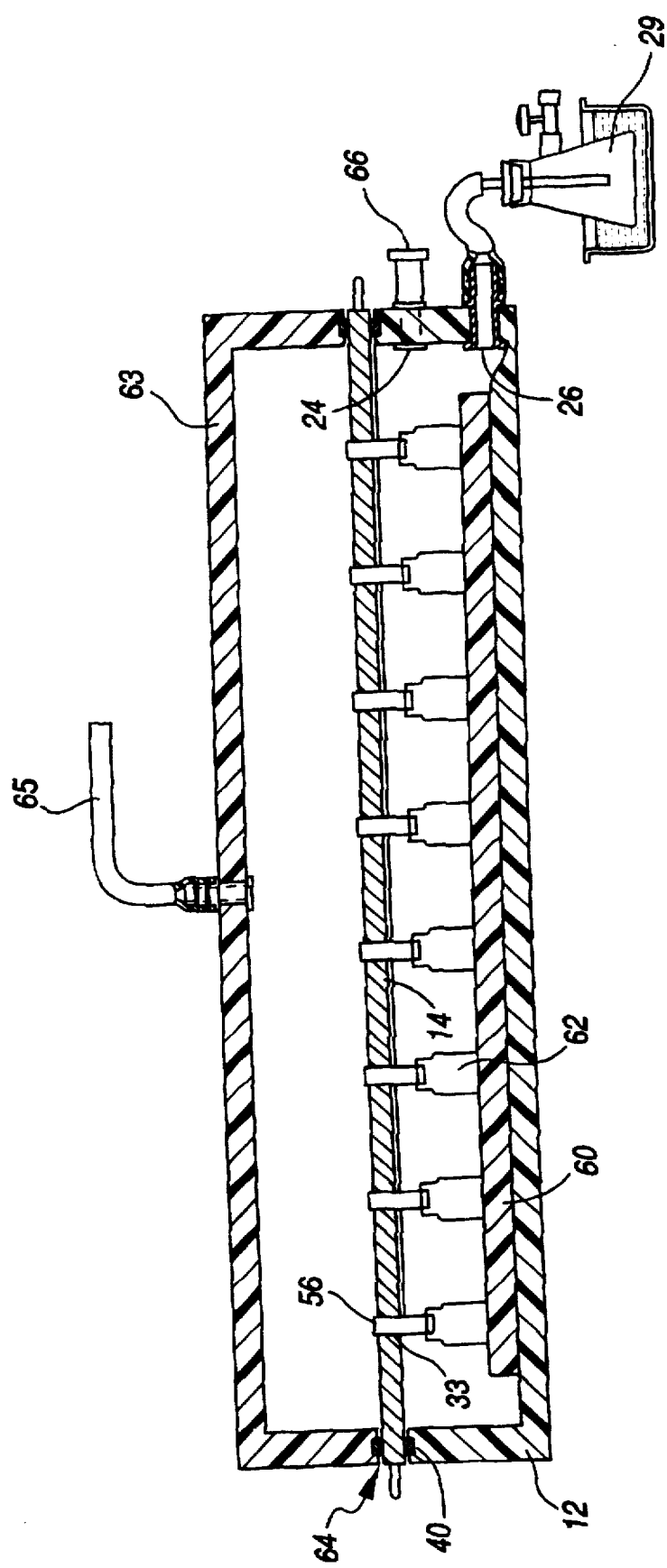
FIG. 13 is a sectional view similar to FIG. 4 except that the heating block and reaction vessels have been removed and replaced with a cover or second manifold adapted to introduce gas for evaporating solvents.

The solid phase organic synthesis device 10 shown in FIGS. 1–12 is designed for carrying out three distinct operations: (a) reacting material bound to solid phase resins contained in the vessels 54 while in contact with liquid medium; (b) removal of the liquid medium and washing of the solid phase resins; and (c) introduction of a cleavage liquid to remove the reaction products and collection of products removed from the solid phase resins. These three operation are described in more detail in connection with FIGS. 6–12. In these figures, solid phase resins are represented by small circles and gas bubbles (FIG. 9) are represented by larger circles. A fourth operation may be carried out when the reaction vessels and the heating block are replaced with a cover or second manifold 63 as shown in FIG. 13, which permits passing an inert gas into the product vials to evaporate solvents, thereby concentrating the reaction products.

First, to carry out a reaction with the solid phase resins in the vessels 54, the box 12 and cover plate 14 are used. The heating block 16 is optional, and its use depends on the requirements of the specific reaction. Reactions at ambient temperature may be carried out without the heating block 16. Further, the device 10 can be placed in a refrigerated environment to achieve lower temperatures. During a reaction, an appropriate number of the reaction vessels 54 are inserted into the holes 33 of the cover plate 14. Unused holes 33 can be blocked with plugs, sealing corks, luer lock valves, or the like.

Figure 6:
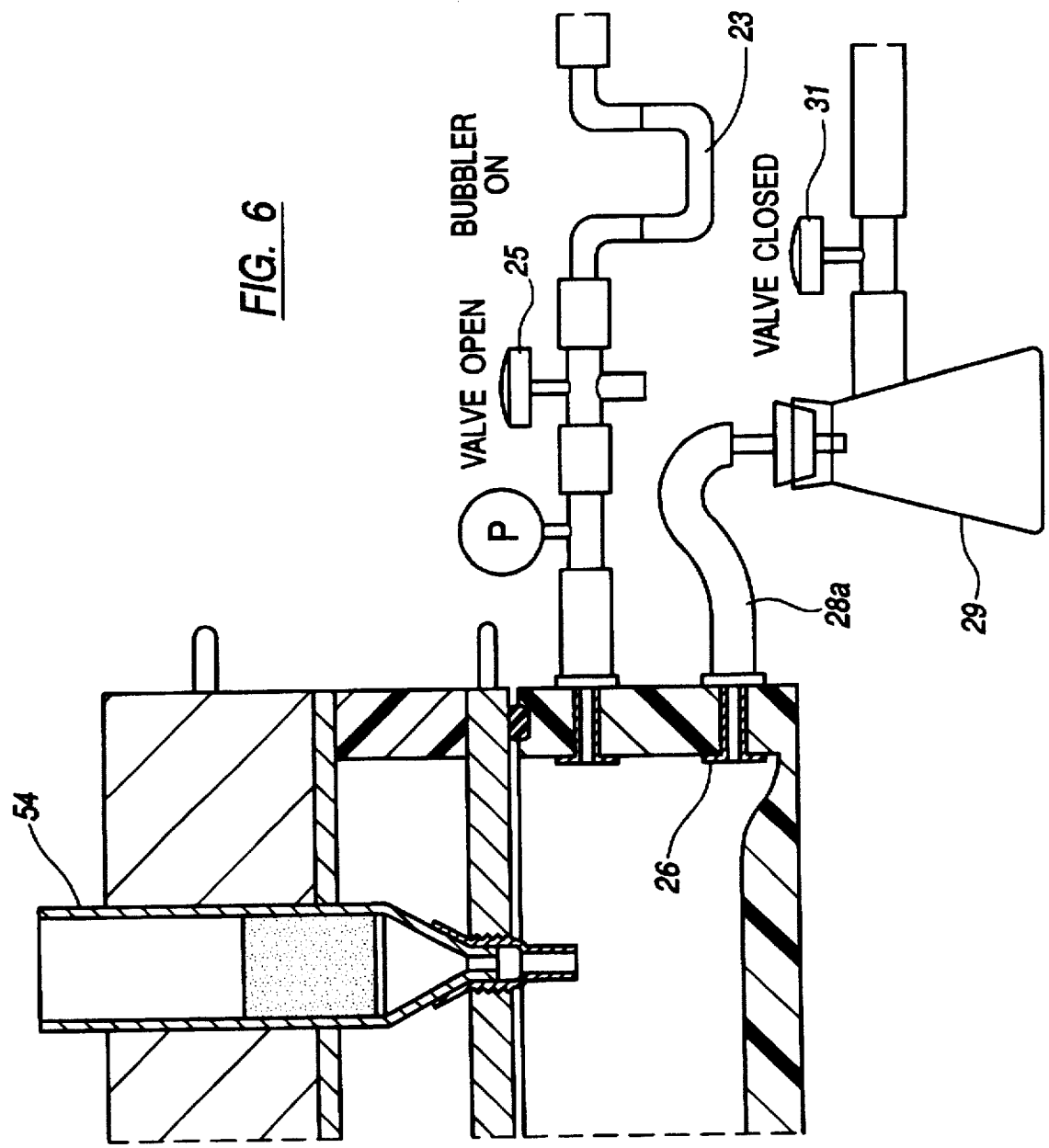
FIG. 6 is a sectional view similar to FIG. 3 showing the application of slight positive pressure within the manifold to keep reagents and solvents in contact with the solid phase resins in the flow-through reaction vessels during a reaction.
Figure 7:
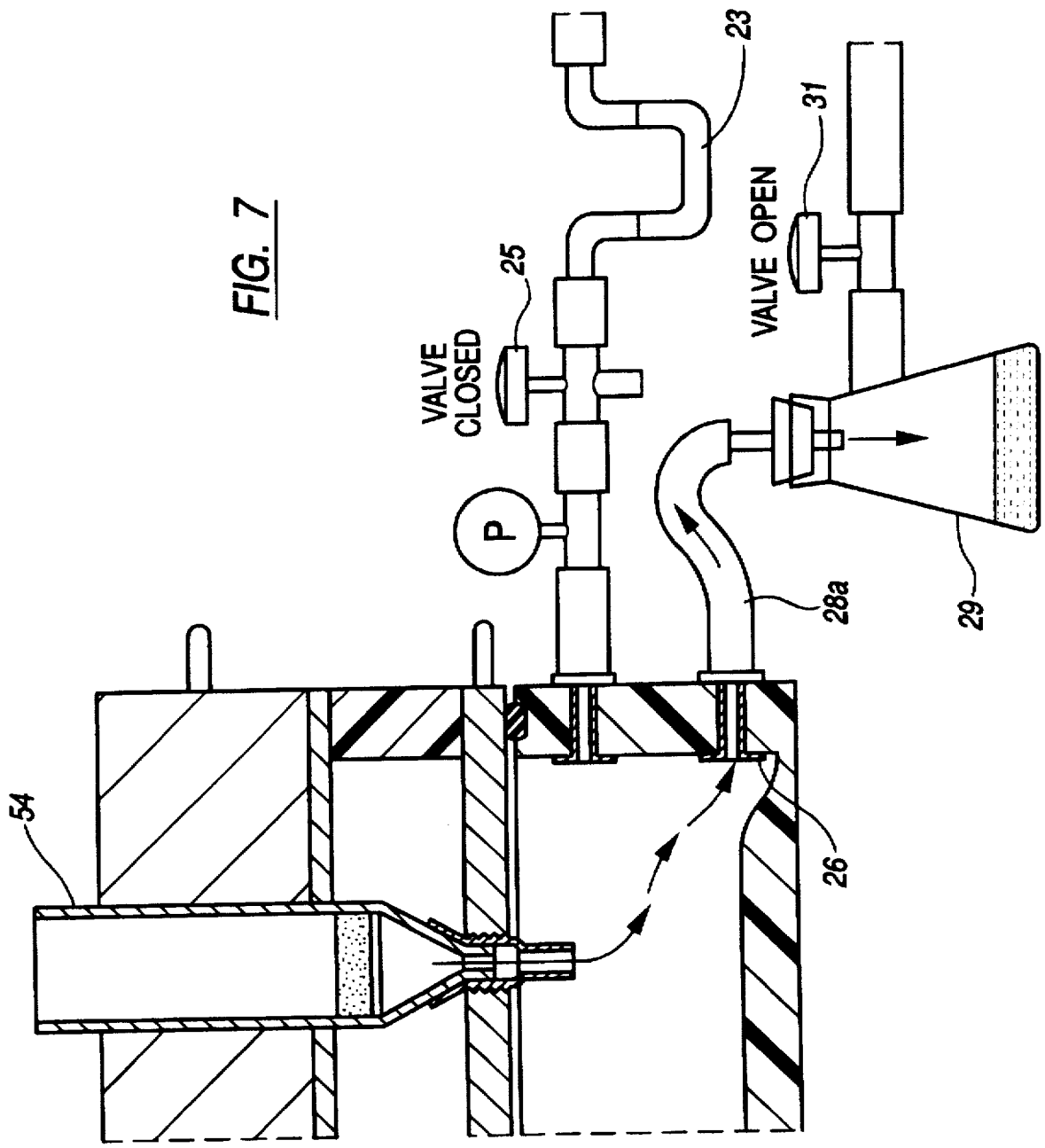
FIG. 7 is a sectional view similar to FIG. 3 showing the application of a vacuum within the manifold to remove reagents and solvents from the solid phase resins in the flow-through reaction vessels during a reaction.
Figure 8:
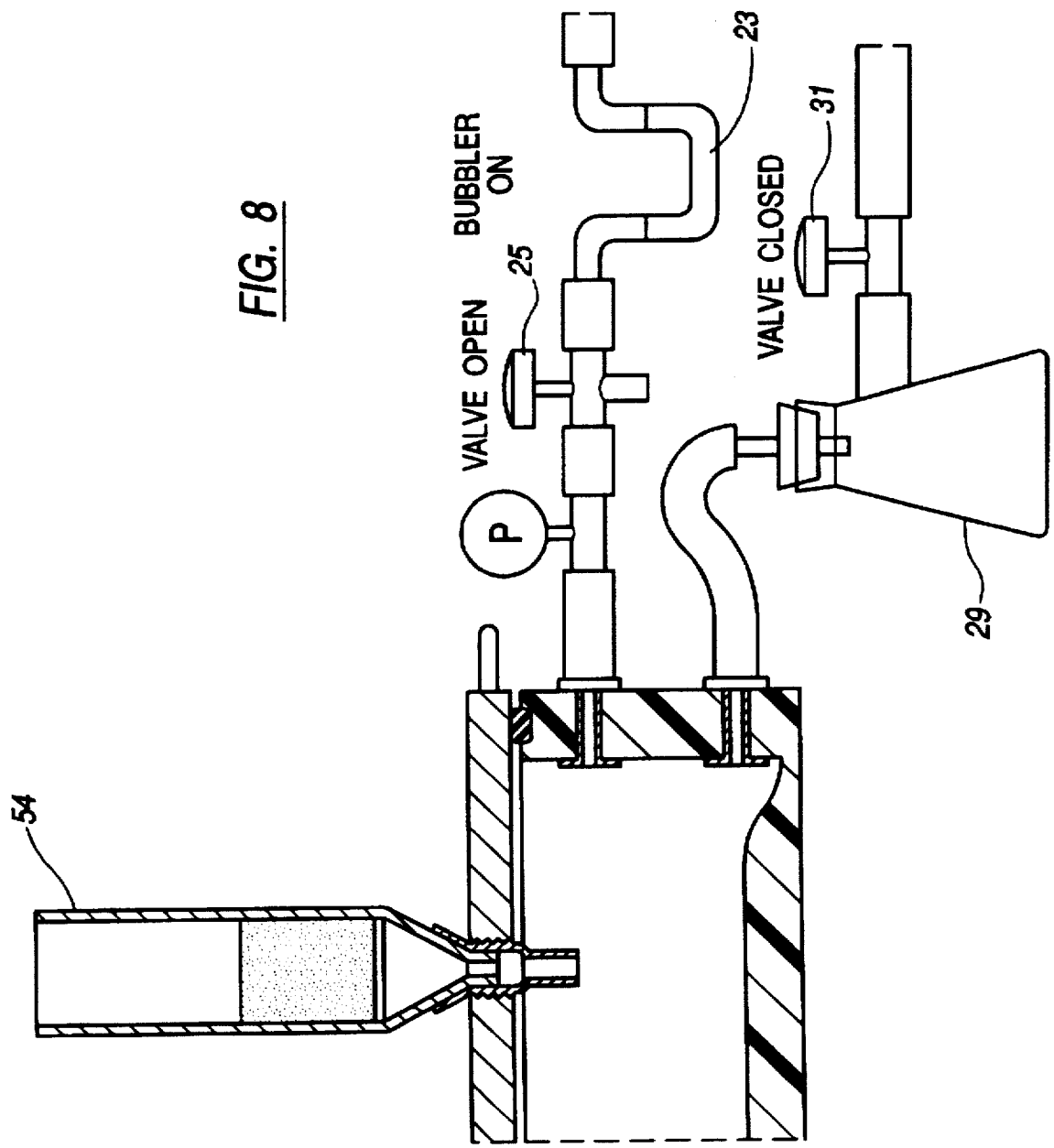
FIG. 8 is a sectional view similar to FIG. 3 showing the application of slight positive pressure within the manifold to keep wash solvents in contact with the solid phase resins in the flow-through reaction vessels during washing.
Figure 9:
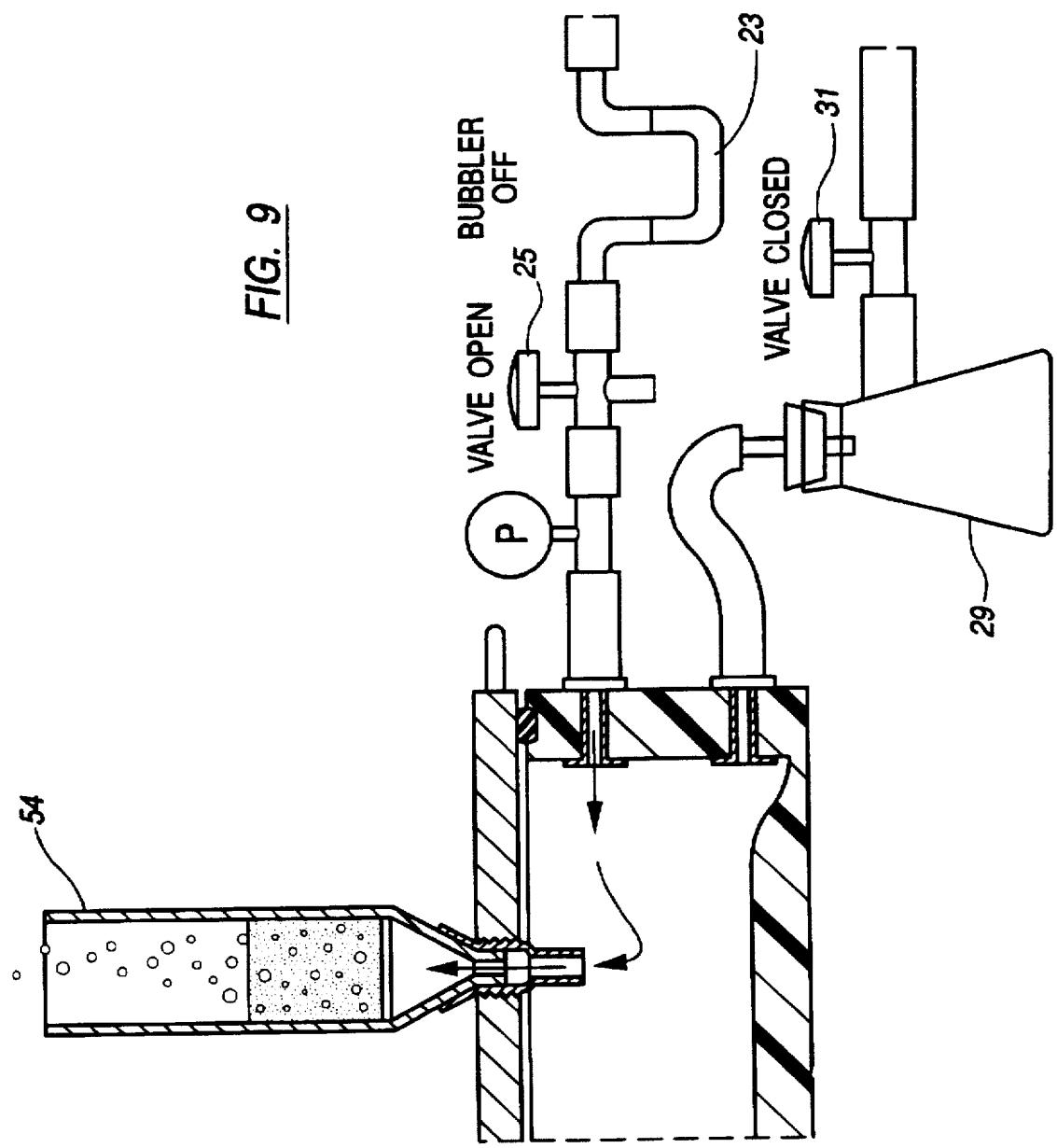
FIG. 9 is a sectional view similar to FIG. 3 showing the application of positive pressure within the manifold to mix or agitate the solid phase resins in the flow-through reaction vessels during washing.
Figure 10:
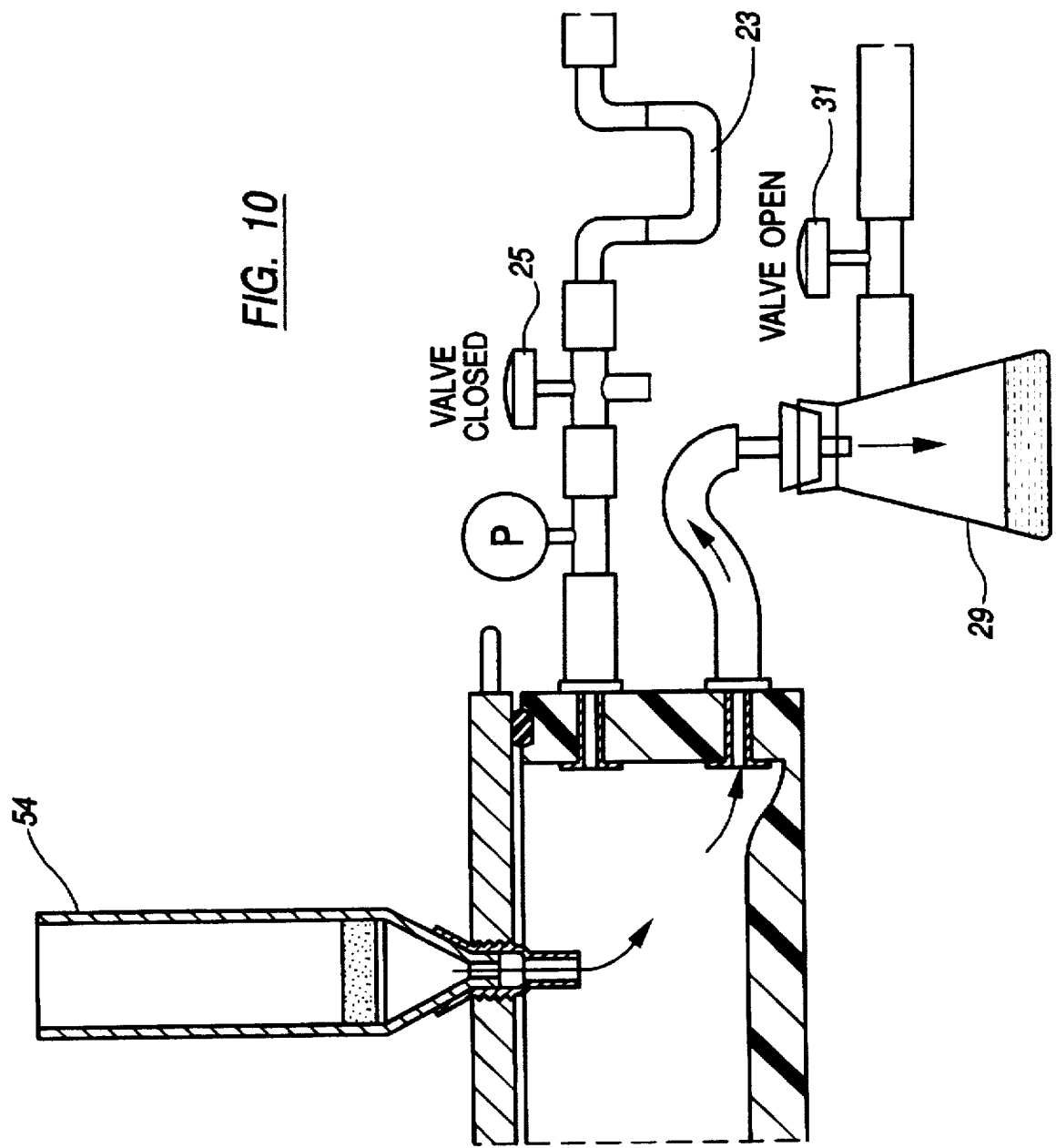
FIG. 10 is a sectional view similar to FIG. 3 showing the application of a vacuum within the manifold to remove wash solvents from the solid phase resins in the flow-through reaction vessels during washing.
Figure 11:
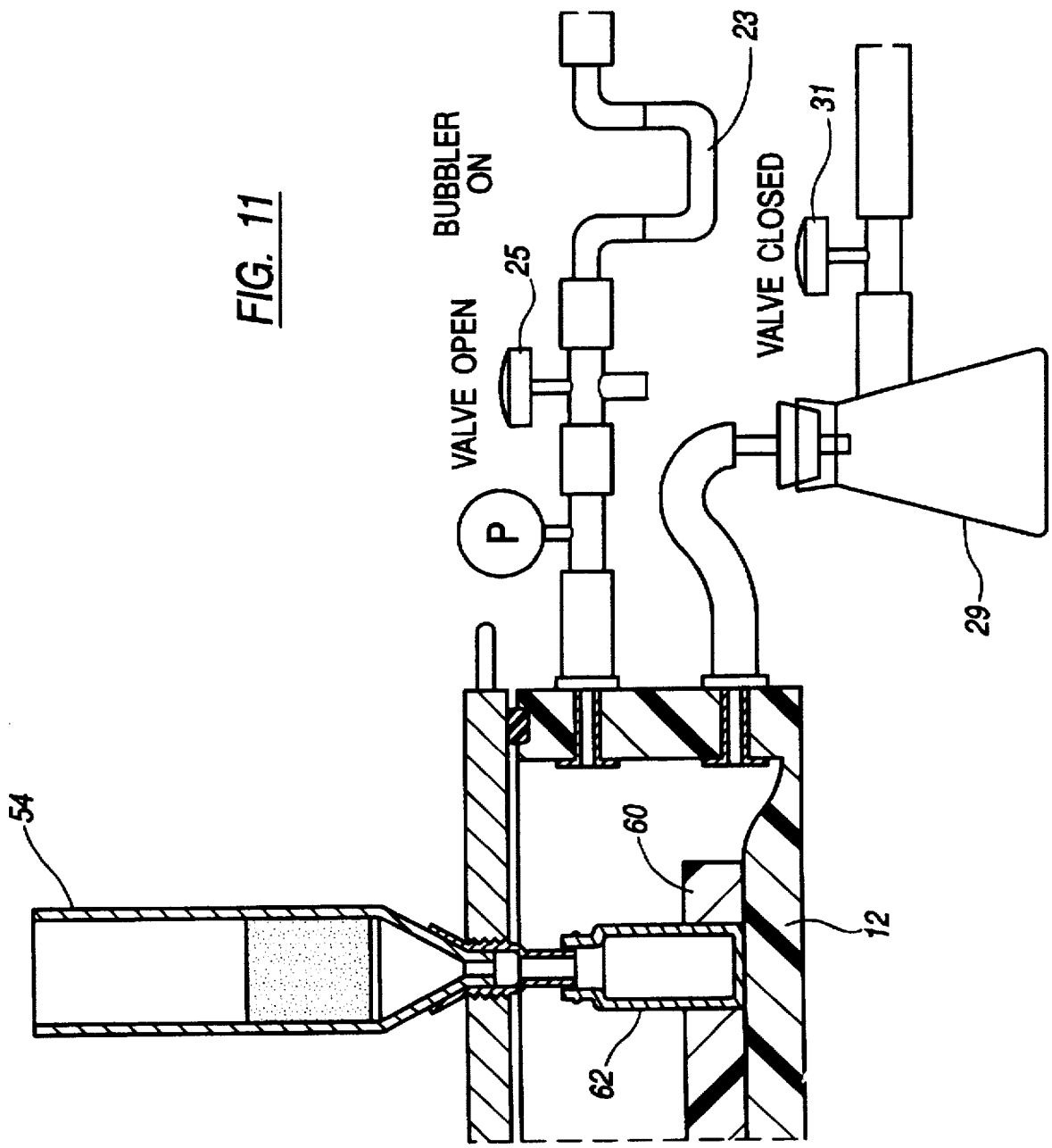
FIG. 11 is a sectional view similar to FIG. 4 showing the application of slight positive pressure within the manifold to keep a cleavage solution in contact with the solid phase resins in the flow-through reaction vessels during a cleavage reaction.

As shown in FIG. 6, to apply a slight positive holding pressure within the manifold for carrying out a reaction, the three-way valve 25 is opened, the oil bubbler 23 is turned on, and the on/off valve 31 is closed. (Alternatively, a self-regulating pressure control valve is used to control pressure in the manifold.) Reagents and solvents are then added to the reaction vessels 54, while the pressure is maintained high enough to prevent liquid from draining out through the bottom of the reaction vessels as they are filled. After being filled, the reaction is allowed to proceed at the desired temperature. The slight positive holding pressure within the manifold keeps the reagents and solvents in contact with the solid phase resins. As shown in FIG. 7, to remove excess reagents and solvents from the solid phase resins after carrying out the reaction, the three-way valve 25 is closed and the on/off valve 31 is opened to apply a vacuum within the manifold. (Alternatively, an automatic vacuum control valve is used to control vacuum in the manifold.) The drained reagents and solvents are suctioned out of the manifold through the vacuum port 26 and hose 28a, and into the waste trap 29.

In the second operation, to wash the solid phase resins in the reaction vessels 54, the device 10 is operated in three modes. In the first mode, shown in FIG. 8, the three-way valve 25 is opened, the oil bubbler 23 is turned on, and the on/off valve 31 is closed in order to apply a slight positive holding pressure within the manifold. (Again, an automatic pressure control valve may be used.) The slight positive holding pressure keeps wash solvents added to the vessels 54 in contact with the solid phase resins. In the second mode, shown in FIG. 9, the three-way valve 25 is opened, the oil bubbler 23 is blocked off, and the on/off valve 31 is closed in order to apply a stronger positive pressure within the manifold, as measured by pressure gauge 27. (If an automatic pressure control valve is used, the setting is raised to provide the higher pressure needed to force gas to bubble up through the liquid). The positive pressure agitates the solid phase resins in the vessels 54 by gas dispersion. In the third mode, shown in FIG. 10, the three-way valve 25 is closed and the on/off valve 31 is opened in order to apply a vacuum within the manifold as discussed above. The vacuum drains the wash solvents into the waste trap 29.

In the third operation, to collect products removed from the solid phase resins in the vessels 54, the device 10 is disassembled, a collection rack 60 (FIG. 4) holding collection vials 62 (FIG. 4) is placed within the box 12, and the device 10 is reassembled. In alternative embodiments, complete disassembly may be avoided by providing means for inserting a collection rack through the side of the box or, alternatively, providing a separator plate between the tips of the reaction vessels and the collection vials which is withdrawn before the third operation is begun. The collection vials 62 are vertically aligned with the corresponding flow-through reaction vessels 54. Cleavage of the desired products from the solid phase resins is achieved by treating the solid phase resins with a cleavage solution added to the reaction vessels 54. During this reaction, shown in FIG. 11, the three-way valve 25 is opened, the oil bubbler 23 is turned on, and the on/off valve 31 is closed as before in order to apply a slight positive holding pressure within the manifold. The slight positive holding pressure keeps the cleavage solution in contact with the solid phase resins. The cleavage reaction is allowed to proceed for the required reaction time. As shown in FIG. 12, the resultant products from the cleavage reaction are collected directly into the vials 62 by closing the three-way valve 25 and opening the on/off valve 31 to apply a vacuum within the manifold as before. Again, use of automatic pressure and vacuum control valves may be substituted for the manually controlled facilities shown.

The resultant products in the vials 62 may subsequently be taken to dryness by removal of volatile components either under a stream of inert gas or by concentration under vacuum. The resultant products are free of major contaminants such as polymeric byproducts, reagents, or solvents used in the process. Further, the resultant products may be used directly for evaluation of biological and/or physical properties or, alternatively, may be purified by conventional purification techniques such as distillation, crystallization, or chromatography to remove minor impurities.

One method of concentrating samples is shown in FIG. 13. The reaction vessels 54 can be removed from plate 14 and the apparatus fitted with top cover 63, which has dimensions similar to the bottom manifold 12. The top cover or second manifold 63 is sealed with a gasket 64 which sits partially in a groove extending upward into the walls of the box of manifold 63. An inert gas line 65 is fitted to the top of manifold 63 to provide suitable flow of gas for evaporation of the volatile components in vials 62. The gasket 64 creates a seal between the top manifold 63 and the plate 40 such that the inert gas is forced through the fittings 56 and directly into vials 62. Pressure of the inert gas entering the top manifold is kept below 2 psig. (13.79 kPa) to avoid over-pressure in the device, using a pressure control device-similar to those previously described. Effluent from the device is carried through trap 29 which is kept in a suitable cooling bath such as dry-ice/acetone (−78° C.) or liquid nitrogen (−199° C.). The remaining port 24 may be capped (66) to allow all the vapors to travel through trap 29. In this manner, the volatile components can be collected and disposed of in an appropriate manner. The use of the device in FIG. 13 for concentration of components has significant advantages over devices known in the art, such as open vessel evaporators and vacuum evaporators. Concentration with a stream of inert gas avoids the need for expensive vacuum devices. Devices known in the art for such concentration have the disadvantage that none of the evaporated solvents are collected. Concentration in the manner shown in FIG. 13 provides for collection of the volatile components in a safe manner. The advantages of this system for safe disposal of chlorinated and/or acidic volatile components will be apparent to those skilled in the art.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A solid phase organic synthesis arrangement, comprising:
    a manifold having a first array of holes opening into the interior of said manifold;
    a plurality of flow-through reaction vessels having openings at the top and bottom and retained in respective ones of said holes of said first array, the interior of said reaction vessels being in communication with the interior of said manifold through the bottom of said reaction vessel, thereby permitting liquids introduced into said vessels to flow out the bottom of said vessels unless prevented from doing so; and
    pressure-regulating means, coupled to said manifold, for regulating gas pressure within said manifold, said pressure-regulating means being capable of creating (a) a vacuum within said manifold for draining liquids contained in said reaction vessels, (b) a slight positive holding pressure relative to the pressure above said vessels within said manifold for preventing liquids from draining into said manifold from said reaction vessels and in contact with solid phase resins in said reaction vessels, and (c) a stronger positive pressure within said manifold for agitating the solid phase resins in said reaction vessels.

2. The arrangement of claim 1, wherein the pressure of (b) is within the range of about 0.05 to 0.2 psig.(0.34 to 1.38 kPa).

3. The arrangement of claim 1, wherein the pressure of (c) is within the range of about 0.2 to 1.0 psig. (1.38 to 6.9 kPa).

4. The arrangement of claim 1, wherein the flow-through reaction vessels have outlets communicating with the interior of said manifold with an internal diameter of about 0.005 to 0.1 in.(0.127 to 2.54 mm).

5. The arrangement of claim 1, wherein said pressure regulating means is capable of providing gas flow sufficient to maintain the positive pressures of (b) and (c).

6. The arrangement of claim 1, wherein the vacuum of (a) is within the range of about −10 to −30 in. Hg(0 to 508 torr).

7. The arrangement of claim 1, wherein said pressure-regulating means includes a pressure port communicating with the interior of the manifold and connected to a pressure control device and an inert gas source, and further includes a vacuum port communicating with the interior of the manifold and connected to a vacuum control device and a vacuum source.

8. The arrangement of claim 7, wherein said pressure control device is a manually operated three-way valve connected to said inert gas source, and said vacuum control device is an on/off valve connected to said vacuum source and wherein said on/off valve is opened and said three-way valve is closed to create said vacuum, wherein said on/off valve is closed, said three-way valve is opened and used to create said slight positive holding pressure, and wherein said on/off valve is closed, said three-way valve is opened and used to create said stronger positive pressure.

9. The arrangement of claim 7, wherein said pressure-regulating, means includes an electronic pressure control valve.

10. The arrangement of claim 7, wherein said pressure-regulating means includes an electronic vacuum control valve.

11. The arrangement of claim 1, further including a heating block mounted to an upper surface of said manifold, said heating block including a second array of holes vertically aligned with said corresponding holes of said first array, said reaction vessels passing through respective ones of said holes of said second array.

12. The arrangement of claim 11, wherein said heating block includes a main body and one or more feet extending downward from said main body, said main body being composed of a thermally conductive material and said feet being composed of a thermally nonconductive material, said feet resting o n said upper surface of said manifold and creating a gap between said manifold and said main body.

13. The arrangement of claim 12, wherein said heating block includes heating means for heating said main body to a temperature warmer than the ambient environment.

14. The arrangement of claim 13, wherein said heating means includes a heating pad mounted to said main body.

15. The arrangement of claim 1, wherein said manifold includes a box and a cover plate detachably connected to said box, said cover plate forming said first array of holes.

16. The arrangement of claim 15, wherein said box includes a bottom, a pair of opposing side walls, and a pair of opposing end walls, said side walls and said end walls extending upward from said bottom, and wherein said cover plate is disposed opposite to said bottom.

17. The arrangement of claim 1, further including a collection rack holding a plurality of collection vials and disposed within said manifold, said collection vials being located beneath respective ones of said reaction vessels.

18. The arrangement of claim 17, further comprising a second manifold mounted on said box in the absence of said flow-through reaction vessels for supplying gas to said collection vials.

19. A solid phase organic synthesis arrangement, comprising:

a box including a bottom, a pair of opposing side walls, and a pair of opposing end walls, said side walls and said end walls extending upward from said bottom, said end walls extending between said pair of side walls;

a cover plate detachably connected to said box, said cover plate being mounted to upper surfaces of said side walls and said end walls and disposed opposite to said bottom, said cover plate and said box forming a manifold, said cover plate including a first array of holes for retaining respective flow-through reaction vessels having openings at the top and bottom such that the interior of said vessels are in communication with the interior of said manifold through the bottom of said reaction vessels, thereby permitting liquids introduced into said vessels to flow out the bottom of said vessels unless prevented from doing so; and pressure-regulating means, coupled to said manifold, for regulating gas pressure within said manifold, said pressure-regulating means being capable of creating a vacuum within said manifold for draining liquids contained in said reaction vessels and varying degrees of positive pressure within said manifold relative to the pressure above said vessels for preventing liquids from draining into said manifold and for agitating solid phase resins disposed in said reaction vessels.

20. The arrangement of claim 19, further including a heating block mounted to an upper surface of said cover plate, said heating block including a second array of holes vertically aligned with said corresponding holes of said first array for receiving said reaction vessels.

21. The arrangement of claim 19, further comprising a removable rack for collection vials for placement inside said box, the holes in said cover plate being aligned with the rack of vials for collecting products from the reaction vessels.

22. The arrangement of claim 21, further comprising a second manifold mounted on said box in the absence of said flow-through reaction vessels for supplying gas to said collection vials.

23. The arrangement of claim 19, wherein said positive pressure is within the range of about 0.05 to 1.0 psig.(0.34 to 6.9 kPa.).

24. The arrangement of claim 19, wherein said vacuum is within the range of about −10 to −30 in Hg(0 to 508 torr).

25. A method of operating a solid phase organic synthesis arrangement including a first manifold forming a first array of holes opening into an interior of said manifold; a plurality of flow-through reaction vessels having openings at the top and bottom and retained in respective ones of said holes of said first array, the interior of said reaction vessels being in communication with the interior of said manifold through the bottom of said reaction vessels, thereby permitting liquids introduced into said vessels to flow out the bottom of said vessels unless prevented from doing so, said reaction vessels containing solid phase resins; and pressure-regulating means, coupled to said manifold, for regulating gas pressure or vacuum within said manifold, comprising the steps of (a) adding liquid reagents to said reaction vessels and maintaining a slight positive holding pressure within said manifold relative to the pressure above said vessels, thereby keeping said reagents in contact with said solid phase resins; and (b) applying a vacuum within said manifold, thereby drawing liquid reagents out of said reaction vessels, through said manifold, and out of said manifold.

26. The method of claim 25, further including steps of (c) washing said solid phase resins with wash solvents while maintaining a slight positive holding pressure within said manifold; (d) applying a stronger positive pressure within said manifold, said stronger positive pressure agitating said solid phase resins; and (e) applying a vacuum within said manifold, said vacuum drawing said wash solvents out of said reaction vessels, through said manifold, and out of said manifold.

27. The method of claim 26, further including the steps of (f) adding cleavage solution to said reaction vessels while maintaining a slight positive holding pressure within said manifold, said slight positive holding pressure keeping said cleavage solution in contact with said solid phase resins; and (g) applying a vacuum within said manifold, said vacuum drawing said reaction products out of said reaction vessels, and into a set of collection vials.

28. The method of claim 27, further including the steps of (h) removing said reaction vessels and securing a second manifold to said first manifold; and (i) supplying a stream of inert gas to said second manifold, passing said inert gas through said collection vials, and withdrawing inert gas from said first manifold.

29. The method of claim 28, further including the step of (j) passing said inert gas leaving said second manifold through a trap to condense and collect solvents evaporated from said collection vials.

* * * * *